United States Patent
Mahowald et al.

(10) Patent No.: US 9,189,078 B2
(45) Date of Patent: Nov. 17, 2015

(54) ENHANCING KEYCAP LEGEND VISIBILITY WITH OPTICAL COMPONENTS

(75) Inventors: Peter H. Mahowald, Los Altos, CA (US); Ronald J. Moller, Los Gatos, CA (US); M. Evans Hankey, San Francisco, CA (US); Bart K. Andre, Cupertino, CA (US); Rafael Dionello, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 12/973,888

(22) Filed: Dec. 20, 2010

(65) Prior Publication Data
US 2012/0154289 A1 Jun. 21, 2012

(51) Int. Cl.
*H01H 13/83* (2006.01)
*F21V 7/04* (2006.01)
*G06F 3/02* (2006.01)

(52) U.S. Cl.
CPC .............. *G06F 3/0202* (2013.01); *F21V 7/048* (2013.01); *H01H 13/83* (2013.01); *H01H 2219/03* (2013.01); *H01H 2219/056* (2013.01); *H01H 2219/06* (2013.01); *H01H 2221/0702* (2013.01)

(58) Field of Classification Search
CPC .............. H01H 13/83; H01H 2219/06; H01H 2219/03; H01H 2219/062; H01H 2219/0621; H01H 2219/0622; H04M 1/22; H03K 17/969; G01D 11/28; F21V 7/048
USPC .............. 362/23, 23.03, 23.14; 345/168–170; 341/22, 23, 28; 400/490, 493, 493.1, 400/494
See application file for complete search history.

(56) References Cited

U.S. PATENT DOCUMENTS

| | | | | |
|---|---|---|---|---|
| 3,848,723 A | * | 11/1974 | Hogue | 400/490 |
| 4,491,692 A | | 1/1985 | Lee | |
| 4,656,078 A | * | 4/1987 | Goto et al. | 428/204 |
| 4,806,908 A | | 2/1989 | Krupnik | |
| 5,225,818 A | | 7/1993 | Lee et al. | |
| 5,234,744 A | * | 8/1993 | Kenmochi | 428/195.1 |

(Continued)

FOREIGN PATENT DOCUMENTS

| | | |
|---|---|---|
| DE | 203 08 525 | 8/2003 |
| EP | 1 729 205 A2 | 12/2006 |

(Continued)

OTHER PUBLICATIONS

Kawaomo JP 2003217381 A, "Input Key, Key Input Device and Electronic Apparatus", Jul. 31, 2003, Canon Electronics Inc, English Machine Language translation by AIPN (Advance Industrial Property Network by JPO).*

(Continued)

*Primary Examiner* — Alan Cariaso

(57) ABSTRACT

Techniques and apparatus to provide improved visibility to user input devices, such as keys, are disclosed. In low light conditions, key legends can be difficult to distinguish. For example, often keys have legends on them to visually distinguish them from one another, but in low light conditions it can be difficult for users to visually identify the different keys. The legends can be textual and/or graphic. Hence, according to one embodiment, light from a nearby (e.g., attached) display device can be used to provide illumination to the user input devices (e.g., keys). The user input devices can be configured to include reflective optical components to enhance reflection of light and thereby improve visibility of the keys or the legends thereon.

33 Claims, 14 Drawing Sheets

(56) References Cited

U.S. PATENT DOCUMENTS

| | | | |
|---|---|---|---|
| 5,266,949 A | 11/1993 | Rossi | |
| 5,510,782 A | 4/1996 | Norris et al. | |
| 5,612,692 A | 3/1997 | Dugas et al. | |
| 5,669,694 A | 9/1997 | Morton, Sr. | |
| 5,684,513 A | 11/1997 | Decker | |
| 5,708,428 A | 1/1998 | Phillips | |
| 5,815,225 A | 9/1998 | Nelson | |
| 5,975,711 A * | 11/1999 | Parker et al. | 362/24 |
| 6,036,326 A * | 3/2000 | Yoshikawa et al. | 362/23 |
| 6,040,822 A * | 3/2000 | Decker | 345/168 |
| 6,191,939 B1 | 2/2001 | Burnett et al. | |
| 6,196,738 B1 * | 3/2001 | Shimizu et al. | 400/490 |
| 6,262,884 B1 | 7/2001 | Hwang et al. | |
| 6,498,311 B1 * | 12/2002 | Stewart et al. | 200/313 |
| 6,608,271 B2 * | 8/2003 | Duarte | 200/311 |
| 6,608,272 B2 | 8/2003 | Garcia | |
| 6,621,027 B1 * | 9/2003 | Shimizu et al. | 200/341 |
| 6,726,106 B1 | 4/2004 | Han et al. | |
| 6,771,333 B2 | 8/2004 | Tanaka et al. | |
| 6,805,506 B2 * | 10/2004 | Bar-Yona | 400/485 |
| 6,940,569 B2 | 9/2005 | Tanaka et al. | |
| 6,987,466 B1 | 1/2006 | Welch et al. | |
| 7,049,530 B2 * | 5/2006 | Hayashizaki | 200/5 A |
| 7,090,368 B2 * | 8/2006 | Oross et al. | 362/84 |
| 7,236,154 B1 | 6/2007 | Kerr et al. | |
| 7,293,890 B2 * | 11/2007 | Chang | 362/85 |
| 7,629,547 B2 * | 12/2009 | Heath et al. | 200/310 |
| 7,683,279 B2 * | 3/2010 | Kim | 200/310 |
| 7,727,618 B2 * | 6/2010 | Iwano | 428/204 |
| 8,684,579 B2 * | 4/2014 | Chuang et al. | 362/602 |
| 8,740,443 B2 * | 6/2014 | Ahlgren et al. | 362/628 |
| 2002/0050975 A1 | 5/2002 | Knox et al. | |
| 2002/0063816 A1 | 5/2002 | Nakamura et al. | |
| 2004/0067087 A1 | 4/2004 | Al-raheem et al. | |
| 2004/0081503 A1 | 4/2004 | Al-raheem et al. | |
| 2004/0227867 A1 | 11/2004 | Tanaka et al. | |
| 2009/0091912 A1 * | 4/2009 | Lee | 362/30 |
| 2009/0128372 A1 * | 5/2009 | Wu et al. | 341/23 |
| 2009/0128492 A1 | 5/2009 | Yoo et al. | |
| 2009/0173610 A1 | 7/2009 | Bronstein et al. | |
| 2009/0225028 A1 | 9/2009 | Abrams et al. | |
| 2009/0242368 A1 | 10/2009 | Chang et al. | |
| 2010/0026632 A1 * | 2/2010 | Ishida et al. | 345/170 |
| 2010/0089729 A1 * | 4/2010 | Li et al. | 200/313 |
| 2012/0111704 A1 * | 5/2012 | Stohr et al. | 200/341 |

FOREIGN PATENT DOCUMENTS

| | | |
|---|---|---|
| EP | 1 768 012 A2 | 3/2007 |
| EP | 2 031 616 A2 | 3/2009 |
| JP | A H08-087009 | 4/1998 |
| JP | 2002-298681 | 10/2002 |
| JP | 2003-217381 | 7/2003 |
| JP | 2006-060334 | 3/2006 |
| KR | 10-1996-0001815 | 1/1996 |

OTHER PUBLICATIONS

Written Opinion for International Application No. PCT/US2011/065421, mailed Jun. 27, 2012.
International Search Report for International Application No. PCT/US2011/065421, mailed Jun. 27, 2012.
Anon, "Mirror Effect Ink Series", date unknown, 1 page.
Office Action for Taiwanese Patent application No. 100147579, mailed Jan. 10, 2014.
Office Action for Mexican Patent Application No. MX/a/2013/007124, mailed Mar. 19, 2014.
Office Action for Japanese Patent Application No. 2013-546249, mailed Jun. 30, 2014.
Office Action for Taiwanese Patent Application No. 100147579, mailed Aug. 29, 2014.
Office Action for Australian Patent Application No. 2011349603, mailed Nov. 18, 2014.
Office Action for Mexican Patent Application No. MX/a/2013/007124, mailed Jul. 3, 2014.
Notice of Preliminary Rejection for Korean Patent Application No. 10-2013-7019163, mailed Sep. 5, 2014.

* cited by examiner

ENHANCING KEYCAP LEGEND VISIBILITY WITH OPTICAL COMPONENTS

BACKGROUND OF THE INVENTION

1. Field of the Invention

The present invention relates to illumination of keys for electronic devices and, more particularly, to illumination of keys for electronic devices using reflected light.

2. Description of the Related Art

Computing devices, such as notebook computers, mobile phones, netbook computers, e-readers and others, commonly provide one or more keys for user selection. The keys are often provided in a keyboard or keypad. In order for user to see and visually distinguish between the keys, the keys include legends. For example, a given key might be for the character "a", the number "1" or a symbol "#". Providing the legends in a color that has a high contrast to a base color of the keys can be helpful to visibility. In some cases, these computer systems can provide backlighting to the keys. The backlighting provides illumination to the keys so that a user can visually distinguish between the keys. Such illumination is particularly useful when the computing devices are used in low light conditions.

Unfortunately, however, providing backlighting requires additional circuitry and optical components. Backlighting when active also consumes power and thus renders the computing device less power efficient. Accordingly, there is a continuing need to provide alternative ways to provide illumination of keys for low light conditions.

SUMMARY

The invention pertains to techniques and apparatus to provide improved visibility to user input devices, such as keys. In low light conditions, key legends can be difficult to distinguish. For example, often keys have legends on them to visually distinguish them from one another, but in low light conditions it can be difficult for users to visually identify the different keys. The legends can be textual and/or graphic. Hence, according to one embodiment, light from a nearby (e.g., attached) display device can be used to provide illumination to the user input devices (e.g., keys). More particularly, in one embodiment, some light from the nearby display device can be directed towards and reflected from the user input devices to enhance visibility of the keys or the legends thereon. As discussed below, the user input devices (e.g., keys) can be configured to enhance reflection of light toward the user and thereby improve visibility of the keys or the legends thereon. Some or all of the user input devices can be configured to include one or more optical components to enhance reflection of light and thereby improve visibility of the keys or the legends thereon.

The invention can be implemented in numerous ways, including as a method, system, device, or apparatus. Several embodiments of the invention are discussed below.

As a computing device, one embodiment can, for example, include at least a display for presenting displayed data, and at least one key configured to facilitate user input to the computing device. The at least one key including a key structure and an angled reflective surface disposed adjacent the key structure. The angled reflective surface is an optical structure whose function is to aim light toward the user As a method for illuminating keys of a portable computing device using light from a display associated with the portable computing device, one embodiment can, for example, include at least: providing one or more keys with an angled reflective surface; receiving, at the one or more keys, at least a portion of light emitted from the display and directed toward the one or more keys; reflecting a portion of the light emitted from the display and directed toward the one or more keys via the angled reflective surface corresponding to the one or more keys; and providing the reflected light to a user position.

As a computing device, one embodiment can, for example, include at least a display for presenting displayed data, and at least one key configured to facilitate user input to the computing device. The at least one key including a key structure and a reflective blaze structure disposed adjacent the key structure.

As a non-backlit key of an electronic device, one embodiment can, for example, include at least a top surface, and a reflective optical component formed proximate the top surface and representing a legend. The reflective optical component is operable to reflect light in a controlled manner such that the legend of the non-backlit key is more visible in low light conditions.

A blaze for a key according to one embodiment can have a substantially reflective surface with a non-zero angle in x, y, or both with respect to a top surface of the key for the purpose of controllably spreading light across likely user positions and reduce wasting light in directions where a user is seldom located.

A key of a keyboard according to one embodiment can include a key body configured to receive a user input, and a legend disposed on the key body. The legend occupies only a portion of the key body, and the legend being formed by a reflective material. The legend also include one or more optical components that enhance visibility of the legend in low light conditions.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

The invention pertains to techniques and apparatus to provide improved visibility to user input devices, such as keys. In low light conditions, key legends can be difficult to distinguish. For example, often keys have legends on them to visually distinguish them from one another, but in low light conditions it can be difficult for users to visually identify the different keys. The legends can be textual and/or graphic. Hence, according to one embodiment, light from a nearby (e.g., attached) display device can be used to provide illumination to the user input devices (e.g., keys). More particularly, in one embodiment, some light from the nearby display device can be directed towards and reflected from the user input devices to enhance visibility of the keys or the legends thereon. As discussed below, the user input devices (e.g., keys) can be configured to enhance reflection of light toward the user and thereby improve visibility of the keys or the legends thereon. Some or all of the user input devices can be configured to include one or more optical components to enhance reflection of light and thereby improve visibility of the keys or the legends thereon.

Embodiments of the invention are discussed below with reference to FIGS. 1A-9. However, those skilled in the art will readily appreciate that the detailed description given herein with respect to these figures is for explanatory purposes as the invention extends beyond these limited embodiments. The illustrations provided in these figures are not necessarily drawn to scale; instead, the illustrations are presented in a manner to facilitate presentation.

Figure 1A:
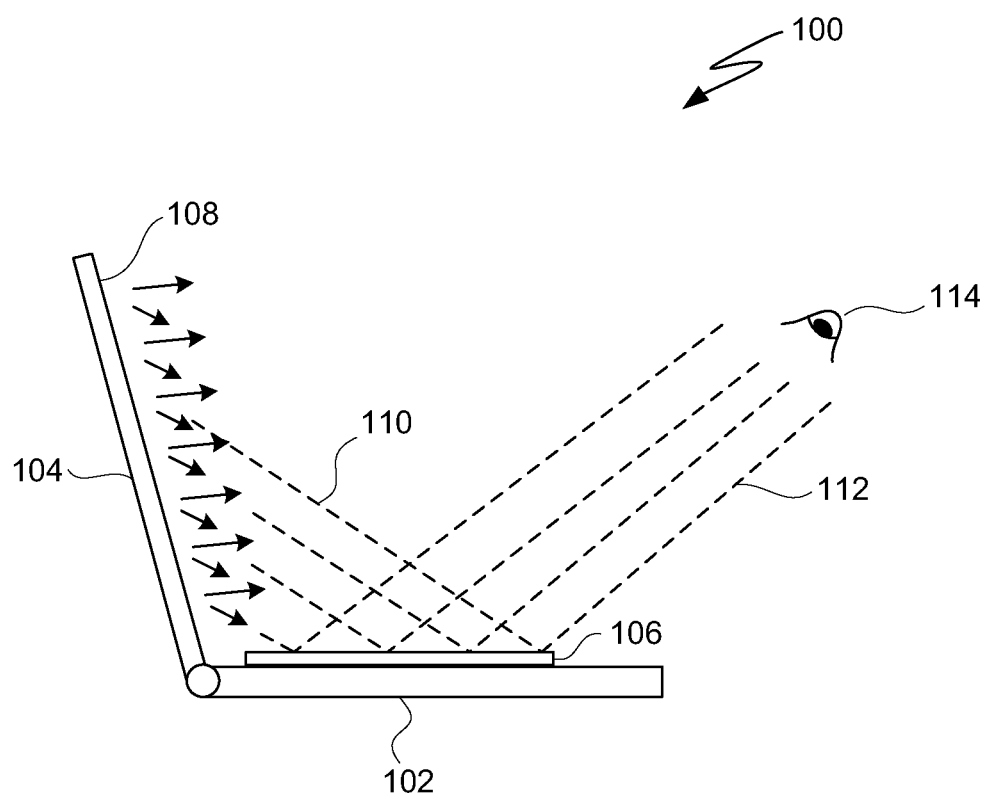
FIG. 1A is a side view of an electronic device according to one embodiment.

FIG. 1A is a side view of an electronic device 100 according to one embodiment. The electronic device 100 is, for example, a mobile computing device (e.g., a laptop computer, a notebook computer or a netbook computer), a mobile communication device (e.g., a mobile phone), a digital media playback device (e.g., a DVD player), a health/medical device, or an automotive device. The electronic device 100 includes a base portion 102 and a top portion 104. The base portion 102 houses at least one printed circuit board together with various electrical components that interoperate to provide an electronic device (e.g., computing device) for either general purposes or specific purposes. The base portion 102 also supports a user input region 106. The user input region 106 can receive user inputs from the user of the electronic device. For example, the user input region 106 can include a keyboard or keypad having a plurality of keys. The top portion 104 can contain a display device 108. When operating, the display device 108 produces light for illumination of text or graphics being presented on the display device 108. While most of the light from the display device 108 is typically emitted normal to the surface of the display device 108, a portion of the light, referred to as incident light 110, can also be directed towards the base portion 102. The portion of the light from the display device 108 that is directed towards the base portion 102 can be reflected from one or more of the keys (e.g., key tops or key caps) of the user input region 106 (e.g., keyboard). Each of one or more of the keys can also include an optical component to increase the amount of reflected light 112. The reflected light 112 can be directed towards the eyes 114 of a user of the electronic device 100. Consequently, the reflected light 112 facilitates the user in recognizing legends provided on the keys in the user input region 106 (e.g., keyboard) in low light conditions.

Figure 1B:
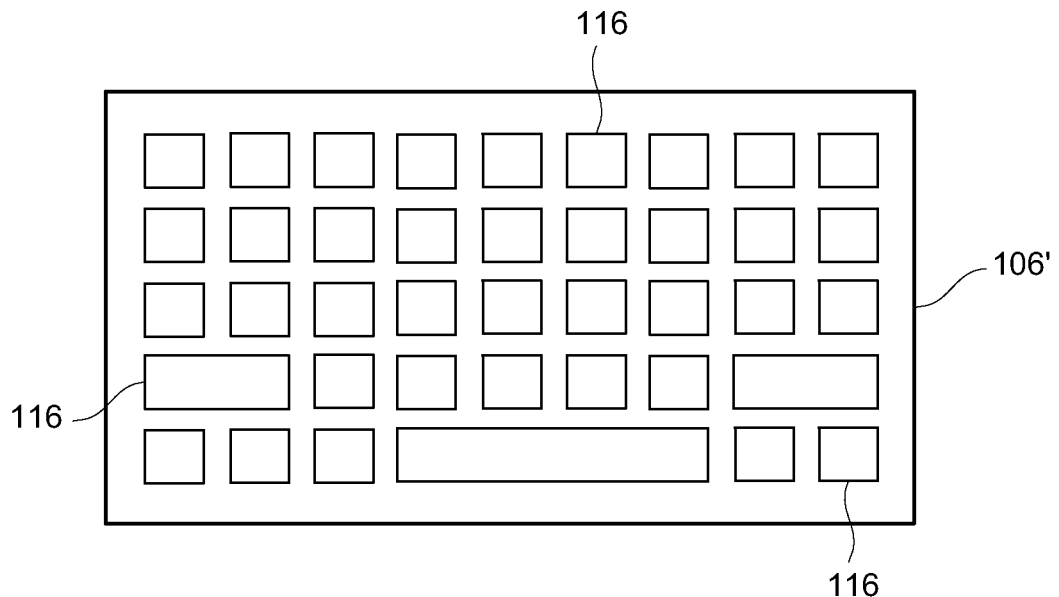
FIG. 1B illustrates a top view of a user input region according to one embodiment.

FIG. 1B illustrates a top view of a user input region 106' according to one embodiment. The user input region 106' can include a plurality of keys 116. The keys 116 can have various sizes, configurations and placements. The keys 116 can be relatively flat or they may include a contoured surface. Each of the keys 116 can have a legend (not shown) associated therewith. Typically, the legend would be provided on a visible surface (e.g., top surface) of the corresponding key. The legend can, for example, be a symbol or character, such as an alphanumeric character or a graphic symbol (e.g. logo, icon, etc.).

Figure 1C:
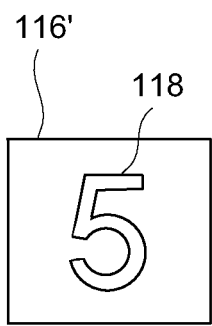
FIG. 1C illustrates a key having a numeric legend (e.g., "5") provided thereon according to one embodiment.

FIG. 1C illustrates a key 116' having a numeric legend 118 (e.g., "5") provided thereon according to one embodiment. In some cases, the legend 118 may be disposed on the top surface of the key 116'. In other cases, although the legend 118 is visible to a user, the legend 118 may be embedded within the key 116'. For example, the legend 118 may be disposed within or underneath a translucent/transparent layer provided on the outermost top surface of the key 116'.

Figure 1D:
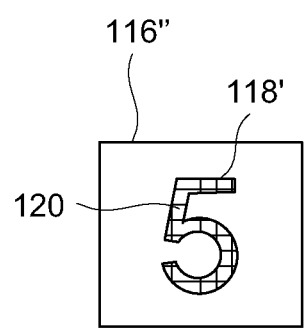
FIG. 1D illustrates a key having a numeric legend with one or more optical components according to one embodiment.

FIG. 1D illustrates a key 116" having a numeric legend 118' with one or more optical components 120 according to one embodiment. The one or more optical components 120 can be engineered redirect light from a light source, such as from a display device. By way of example, the legends 118' may be engineered to reflect light thereby making the legends 118' more visually distinct. In so doing, a dedicated backlight that could illuminates legends on keys may be minimized or even eliminated. This may help reduce the size of an electronic device, i.e., stack up can be reduced which allows devices to be thinner.

In the embodiment illustrated in FIG. 1A, the incident light 110 is from a display device 104. The display device 104 can be coupled to the base portion 102 as shown in FIG. 1A. Alternatively, the electronic device 100 may include a light source that is external or decoupled from the electronic device 100. The external light source can be a display device, a light fixture (e.g., lamp), a portable light, sunlight, moonlight, or ambient light. The light from the light source is received, at least in part, on the user input region 106.

Figure 2:
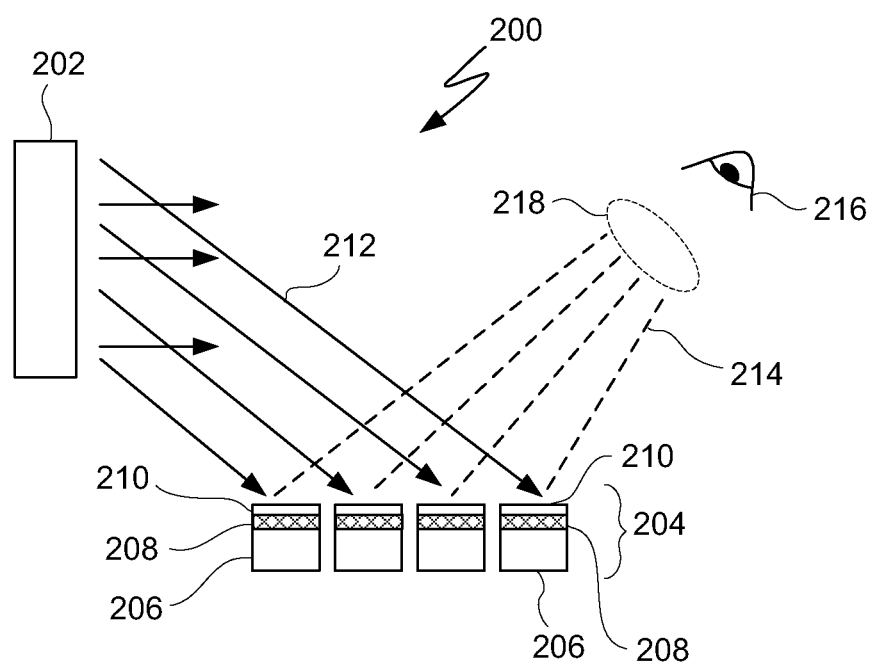
FIG. 2 is a conceptual diagram of an optical arrangement illustrating one embodiment.

FIG. 2 is a conceptual diagram of an optical arrangement 200 illustrating one embodiment. The optical arrangement 200 can, for example, be used with an electronic device. The optical arrangement 200 includes a light source 202. The light source 202 produces light that can be utilized to directly illuminate not only a display device that includes the light source 202 but also to indirectly illuminate keys within a key region 204. The light source 202 is, for example, provided by an integral display screen. For example, the light source 202 can include a backlight of a LCD display screen, OLEDs, or other display technologies. The key region 204 includes a plurality of keys that can be similarly constructed so as to facilitate illumination in low light conditions. In particular, the keys within the key region 204 include key caps 206. A key cap is considered to be an upper portion or top of a key.

The key caps 206 can be modified to facilitate illumination. In particular, according to one embodiment, applied to the top of each of the key caps 206 are a reflective optical component 208 and an outer layer 210. The reflective optical component 208 can operate to reflect at least a portion of the light 212 from the light source 202 that is incident on the key region 204. The incident light 212 impinges on the keys caps 206 in the key region 204, and passes through the output layer 210 and is then partially reflected by the reflective optical component 208 to provide reflected light 214 directed towards the eyes 216 of a user provided at a user position region 218. The user position region 218 can represent a target zone of user positions for a user's eyes. The target zone of user positions can reflect most common user positions. Here, the optical arrangement 200 can enhance reflectivity of light from the light source 202 towards the user position 218 via the reflective optical components 208 of the key caps 206. Advantageously, the tops of the key caps 206, or the legends provided thereon, can be illuminated to enhance user visibility in low light conditions within the user position region 218.

The outer layer 210 can serve as a protective layer (or protective cover) and/or a diffusion layer. The protective layer and the diffusion layer can be separate layers or combined in a single layer.

The protective layer can be provided to protect the reflective optical component 208. The protective layer can be provided over the reflective optical component 208 which is provided on the key caps 206. Typically, the outer layer 210 is substantially optically transparent to the incident light 212 and the reflected light 214.

The reflective optical component 208 directs light to a user position. In some implementations, the reflective optical component 208 can scatter incident light somewhat so that diffusion induced by a diffusion layer may not be needed. The diffusion layer, if provided, can operate to diffuse (or scatter) the reflected light 214 such that the illumination on the key caps 206 is diffused so that any images depicted by the light source 202 are diffused and thus the illumination of the key caps 206 provides general illumination as opposed to a direct reflection of images being depicted by the light source 202. For example, if the light source 202 were part of a display device, and if the display device were to present an image of a mountain on its display with illumination from the light source 202, then the diffusion layer would diffuse the reflected light 214 so that the mountain would not be recognizable from the reflected light 214 being viewed by the user.

Figure 3:
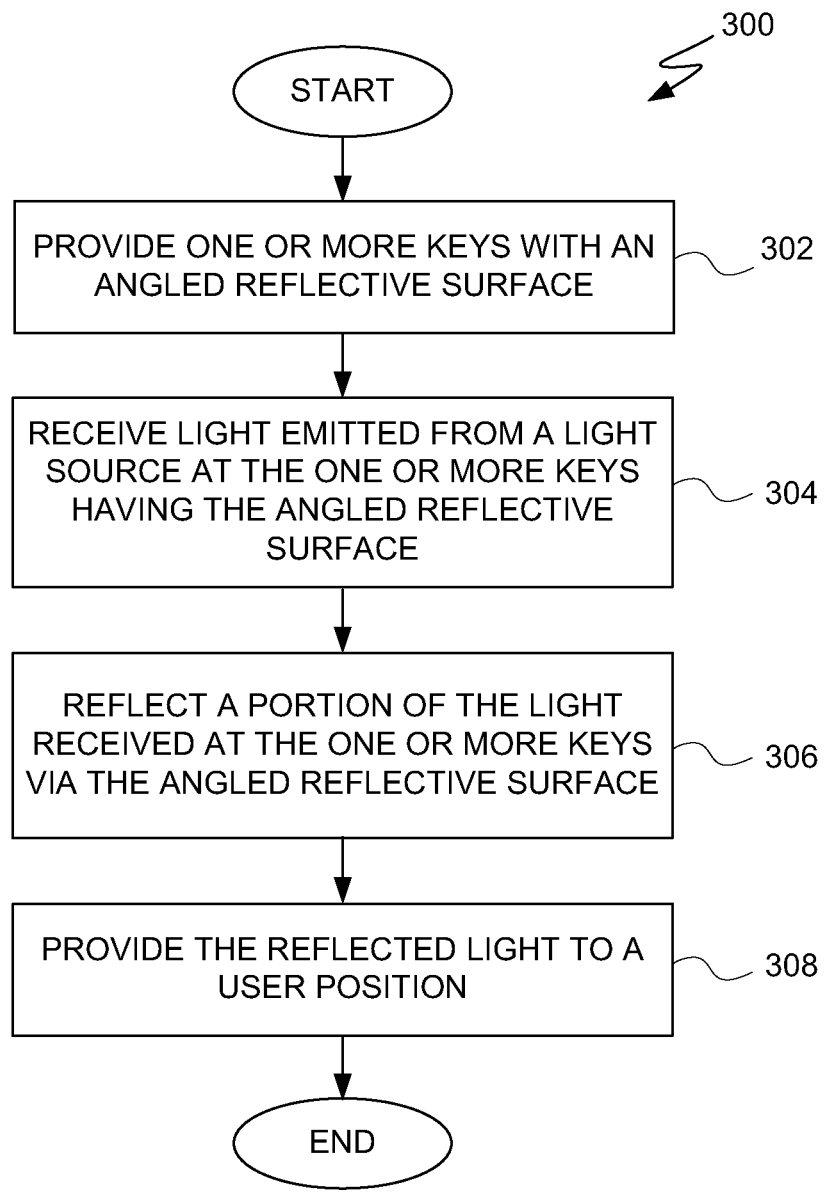
FIG. 3 is a flow diagram of a key illumination process according to one embodiment.

FIG. 3 is a flow diagram of a key illumination process 300 according to one embodiment. The key illumination process 300 is, for example, performed by an electronic device (e.g., computing device) having a light source and a key region with one or more keys. For example, the key illumination process 300 can be performed by the electronic device providing the optical arrangement 200 illustrated in FIG. 2.

The key illumination process 300 provides 302 one or more of the keys in the key region with an optical component. In this embodiment, the optical component is denoted as an angled reflective surface. The one or more keys having the angled reflective surface can receive 304 light emitted from a light source (e.g., a display for the electronic device) at the one or more keys. A portion of the light received at the one or more keys can be reflected 306 via the angled reflective surface. Thereafter, the reflected light can be provided 308 to a user position. As a result, the one or more keys are able to be illuminated using light originating from a light source of the electronic device. The light source can, for example, be a display (screen) of for the electronic device, which can be a portable computer. As such, the key illumination process 300 makes uses of an existing light source (e.g., display device) and thus does not require a dedicated light source (e.g., keyboard backlight). The reflection of the light from the one or more keys is due to the angled reflective surface provided on the one or more keys, which manages the spreading and direction of the light to be reflected to a user of the electronic device. In one implementation, the one or more keys can have key caps as described above with reference to FIG. 2. Various suitable structures or arrangements for keys or key caps are detailed below.

As discussed in more detail below, the optical component provided 302 with one or more of the keys can include at least one angled reflective surface. The angled reflective surface can be provided on a top portion of the corresponding key. The optical component provided with a given key can also include a plurality of angled reflective surfaces. The plurality of reflective surfaces can be provided with a predetermined arrangement of reflective surfaces (or elements). The predetermined arrangement of reflective surfaces can be implemented with at least one grating structure, a multi-faceted surface, or a plurality of independent surfaces.

As noted above, one or more keys of a key region for an electronic device can be provided with an angled reflective surface to enhance illumination of such keys using reflected light from a display. In one implementation, the angled reflective surface can be referred to as a reflective blaze structure. Each of those of the one or more keys can have an angled reflective surface which can be at a different angle for its corresponding angled reflective surface. However, it should be noted that other ones of the keys of the key region can simply be provided with reflective material (i.e., without an optical component such as an angled reflective surface). While a reflective material whether angled or not can reflect light, reflective surfaces that are angled can offer the advantage of being able to reflect greater amounts of light toward the user's eyes (e.g., provided at a user position region 218) while reducing loss of light which is spread into non-user directions.

Figure 4A:
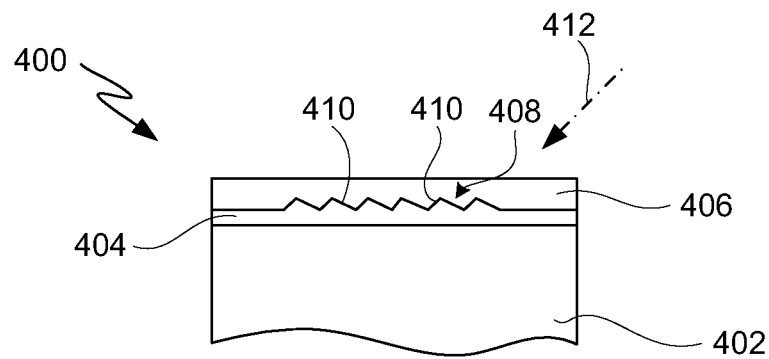
FIG. 4A is a side view of a reflective key according to one embodiment.

FIG. 4A is a side view of a reflective key 400 according to one embodiment. In this embodiment, the reflective key 400 can include a key structure 402, a reflective layer 404 provided on the top surface of the key structure 402, and a protective layer 406 provided over the reflective layer 404. The reflective layer 404 can be secured to, adhered to (e.g., bonded to, adhesive, etc.) or integral with the top surface of the key structure. The reflective layer 404 can include a reflective optical component 408. As shown in FIG. 4A, the reflective optical component 408 can provide one or more reflective surfaces, which can be referred to as a reflective blaze or blaze structure. The structure can be oriented or configured as desired in any one or more axes x, y and/or z. In one embodiment, the reflective optical component 408 can have a reflective grating, such as a sawtooth-shaped groove profile with a plurality of sawtooth-shaped grooves 410. The reflective grating can be itself reflective or can be coated with a reflective material. Although the term grating is used, it should be appreciated that a reflective grating can take a variety of forms including periodic or non-periodic, etc. In some cases, the reflective surfaces of a reflective grading may even include some portions that are periodic while others are non-periodic.

The thickness of the reflective layer 404 depends upon implementation. However, in one example, the reflective layer 404 can have a thickness of about 1-15 micrometers. The thickness of the protective layer 406 also depends upon implementation. However, in one example, the protective layer 406 can have a thickness of about 8-30 micrometers. The reflective layer 404 illustrated in FIG. 4 can be patterned directly or indirectly so that an appropriate legend is provided on the key structure 402.

The reflective layer 404 and the protective layer 406 can be provided in various different ways. In one embodiment, either or both of the reflective layer 404 and the protective layer 406 can be applied by being deposited or sprayed on. The deposited or sprayed on solution for the reflective layer 404 can be ink or paint based and include reflective material, such as small pieces of aluminum, silver or compounds (or alloys) thereof. The sprayed on solution for the protective layer 406 can be UV-cured overcoat. In another embodiment, the reflective layer 404 can be applied by a silkscreen process. The protective layer 406 can be provided by a variety of materials. One suitable material for the protective layer 406 is acrylic paint.

To form the reflective optical component 408, an optical component structure can be placed adjacent the top surface of the key structure 402. The optical component structure can include the plurality of the sawtooth-shaped grooves 410 which can be denoted as the blaze. The optical component structure can be provided by a film or other substrate (e.g., epoxy, cured adhesive) that includes the plurality of sawtooth-shaped grooves 410 formed therein. Also, the sawtooth-shaped grooves 410 shown in FIG. 4A are formed with a right-side primary angle. Here, the reflective optical component 408 is oriented to received incident light 412 from the right. The right-side primary angle can be referred to as a blaze angle.

Although reflective optical component 408 (e.g., the sawtooth-shaped grooves 410) illustrated in FIG. 4A can be formed using a reflective layer 404, it should be noted that, in another embodiment, the reflective optical component 408 could alternatively be integral with or embedded in the upper surface of the key structure 402. However, a reflective coating could thereafter be applied on the reflective optical component 408 if the upper surface of the key structure 402 were itself already non-reflective, which would typically be the case.

The reflective optical component (e.g., the reflective blaze) may be composed of flat or faceted surface segments which are provided at predetermined angles (also known as blaze angles) and are reflective. In the case of a keyboard having a plurality of keys, the predetermined angles for the reflective optical component provided at each of a plurality of the key can vary. The predetermined angles can be described as the angle of the blaze with respect to the plane of the keyboard. The predetermined angles may be positive (toward the display) or negative (toward the user). In a normal laptop computer configuration, one embodiment can have a positive predetermined angle (positive blaze angle), as the user is generally higher from the table than the display is. The positive predetermined angle can control direction of reflected light in a vertical direction relative to the laptop computer. Alternatively or in addition to the control of the vertical direction of the reflective light, the predetermined angle can control direction of reflected light in a horizontal direction relative to the laptop computer. Here, the predetermined angle can tilt keys at the sides of the keyboard towards the user. The predetermined angle (blaze angle) may also be a compound angle. For example, keys at the right hand side of the keyboard may tilt toward the left, redirecting otherwise escaping display light rays back towards the user. Keys at the left hand side of the keyboard may tilt toward the right, redirecting otherwise escaping display light rays back towards the user.

In one embodiment, the reflective optical component (e.g., the reflective blaze) provided on each of a plurality of keys can be separately determined. In other words, the predetermined angle to be used with each of the keys can vary across the keyboard so as to control reflection of light from the key legends to a user position. The blaze may also be adjusted in angle from key to key to create the desired uniformity at a viewing from a user position region. The predetermined angle provided on the plurality of keys can also be composed of faceted segments, which spread the light. The use of faceted segments can serve to spread light and thus makes the keyboard appear dimmer, for the purpose of making the range of quality user positions broader.

Figure 4B:
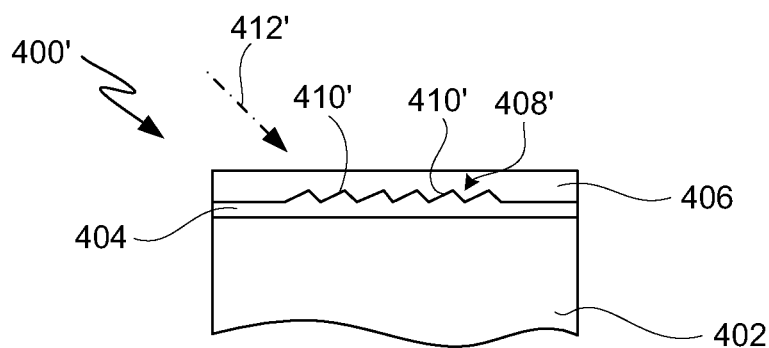
FIG. 4B is a side view of a reflective key according to another embodiment.

FIG. 4B is a side view of a reflective key 400' according to another embodiment. In this embodiment, like FIG. 4A, the reflective key 400' can include the key structure 402, the reflective layer 404 provided on the top surface of the key structure 402, and the protective layer 406 provided over the reflective layer 404. The reflective key 400', however, differs from the reflective key 400 of FIG. 4A only with respect to an optical component. Specifically, the reflective layer 404 can include a reflective optical component 408'. As shown in FIG. 4B, the reflective optical component 408' can provide one or more reflective surfaces, which can be referred to as a reflective blaze or blaze structure. In one embodiment, the reflective optical component 408' can have a reflective grating, such as a sawtooth-shaped groove profile with a plurality of sawtooth-shaped grooves 410. The reflective grating can be itself reflective or can be coated with a reflective material. In this embodiment, the sawtooth-shaped grooves 410' shown in FIG. 4A are formed with a left-side primary angle. Here, the reflective optical component 408' is oriented to received incident light 412' from the left. The left-side primary angle can be referred to as a blaze angle.

Figure 4C:
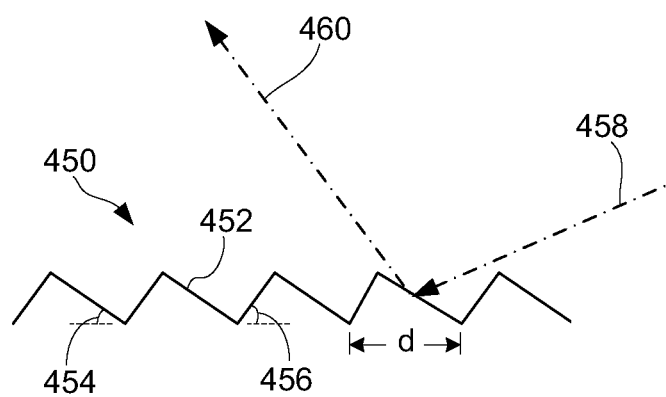
FIG. 4C illustrates a reflective optical component according to one embodiment.

FIG. 4C illustrates a reflective optical component 450 according to one embodiment. The reflective optical component 450 can also be referred to as a blaze structure. The reflective optical component 450 can include a plurality of sawtooth-shaped grooves 452. The distance d between each tooth of the sawtooth-shaped grooves 452 can be referred to as a grating constant. Although the specific dimension of the sawtooth-shaped grooves 452 varies with application, in one embodiment a forward angle 454, which can be referred to as a blaze angle, can about 5-30 degrees, a back angle 456 can be about 10-45 degrees, and the distance d can be about 0.1 mm. In an exemplary specific embodiment, the forward angle (blaze angle) can be about 15 degrees, the back angle can be about 30 degrees, and the distance d can be about 0.1 mm. The reflective optical component 450 can be formed in a substrate (e.g., film, epoxy, adhesive, etc.) and then provided with a reflective coating. The reflective coating can be provided on the substrate by a thin layer of reflective material. The reflective material can be reflective ink, reflective paint, or metal (e.g., aluminum, silver, etc.) that can be sprayed or deposited on the substrate. In any case, the reflective surfaces of the sawtooth-shaped grooves 452 can operate to reflect at least a portion of light 458 from incident light 458. The incident light 458 impinges on the keys having the sawtooth-shaped grooves 452 and can be reflected as reflected light 460 and directed towards a user position such that legends provided on the keys are brighter to the user in low light conditions.

Figure 5A:
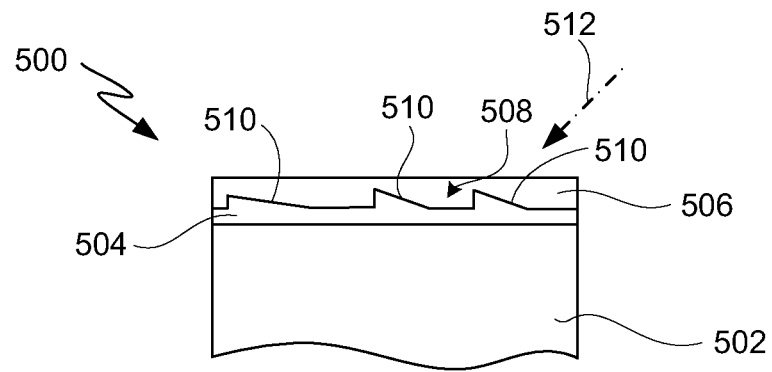
FIG. 5A is a side view of a reflective key according to one embodiment.

FIG. 5A is a side view of a reflective key 500 according to one embodiment. In this embodiment, the reflective key 500 can include a key structure 502, a reflective layer 504 provided on the top surface of the key structure 502, and a protective layer 506 provided over the reflective layer 504. The reflective layer 504 can include a reflective optical component 508. The reflective key 500 is similar to the reflective key 400 illustrated in FIG. 4A, except that the reflective optical component 508 differs from the reflective optical component 408. As shown in FIG. 5A, the reflective optical component 508 can provide one or more reflective surfaces, which can be referred to as a reflective blaze or blaze structure. In one embodiment, the reflective optical component 508 can have a plurality of angled reflective surfaces 510, with some or none or all of the angles for the angled reflective surfaces 510 being different from others. Also, as shown in FIG. 5A, the angled reflective surfaces 510 can be placed in a uniform arrangement (e.g., common blaze angle and separation distance (d) or a non-uniform arrangement (e.g., differing blaze angle and/or separation distance (d). The separation distance (d) can be the same or different in different directions across the surface of a keyboard. The reflective optical component 508 can be itself reflective or can be coated with a reflective material.

The reflective layer 504 and the protective layer 506 can be provided in various different ways. In one embodiment, either or both of the reflective layer 504 and the protective layer 506 can be applied by being deposited or sprayed on. The deposited or sprayed on solution for the reflective layer 504 can be ink or paint based and include reflective material, such as small pieces of aluminum, silver or compounds (or alloys) thereof. The sprayed on solution for the protective layer 506 can be UV-cured overcoat. In another embodiment, the reflective layer 504 can be applied by a silkscreen process. The protective layer 506 can be provided by a variety of materials. One suitable material for the protective layer 506 is acrylic paint.

To form the reflective optical component 508, an optical component structure can be placed adjacent the top surface of the key structure 502. The optical component structure can include the plurality of angled reflective surfaces 510 which can be denoted as the blaze. In this embodiment, the reflective optical component 508 has a plurality of sawtooth-shaped grooves which are not uniformly spaced and which have different angles for at least some of the angled reflective surfaces. In this example shown in FIG. 5A, two of the sawtooth-shaped grooves have the same angled reflective surface, and one of the sawtooth-shaped groves has a different angled reflective surface (smaller angle). The separation distance between each tooth also varies in this example with the separation being larger for the tooth with the smaller angle. The optical component structure can be provided by a film or other substrate (e.g., epoxy, cured adhesive) that includes the plurality of angled reflective surfaces 510 formed therein. The resulting reflective optical component 508 can be engineered with appropriately positioned and angled reflective surfaces 510 to yield desired optical properties.

Figure 5B:
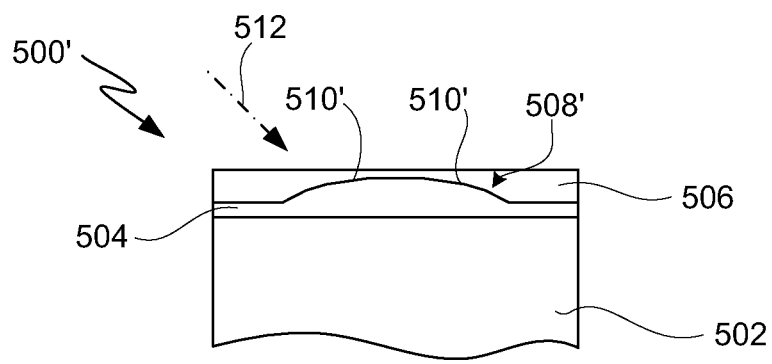
FIG. 5B is a side view of a reflective key according to another embodiment.

FIG. 5B is a side view of a reflective key 500' according to another embodiment. In this embodiment, the reflective key 500' is similar to the reflective key 500 illustrated in FIG. 5A, except that the reflective key 500' include a reflective optical component 508' that is generally faceted in a piece-wise manner with flat segments 510' which offer different angled reflective surfaces.

Figure 5C:
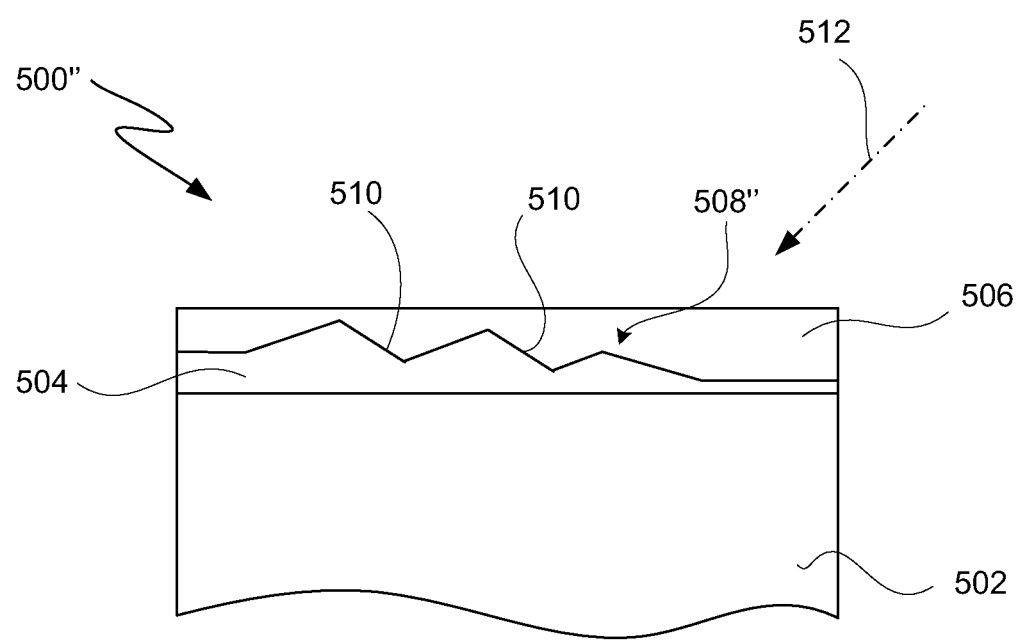
FIG. 5C is a side view of a reflective key according to another embodiment.

FIG. 5C is a side view of a reflective key 500" according to another embodiment. In this embodiment, the reflective key 500" is similar to the reflective key 500 illustrated in FIG. 5A, except that the reflective key 500" includes a reflective optical component 508" that is includes a plurality of different angled reflective surfaces that are formed as sawtooth-shaped grooves. As shown in FIG. 5C, the orientation of the reflective optical component 508" is itself angled with respect to the orientation of the reflective key 500". As depicted, the reflective optical component 508" is higher on the left side than on the right side. Also, the height of each of the sawtooth-shaped grooves are not necessarily the same height, nor are the angles of the sawtooth-shaped grooves necessarily the same angle.

In general, the one or more reflective surfaces provided to a legend to be visibly to a user can be provided at different heights related to each other (z height), and/or can be angled with respect to or about x-axis or y-axis. Hence, each reflective surface can be placed at a defined x, y, and z position.

Figure 5D:
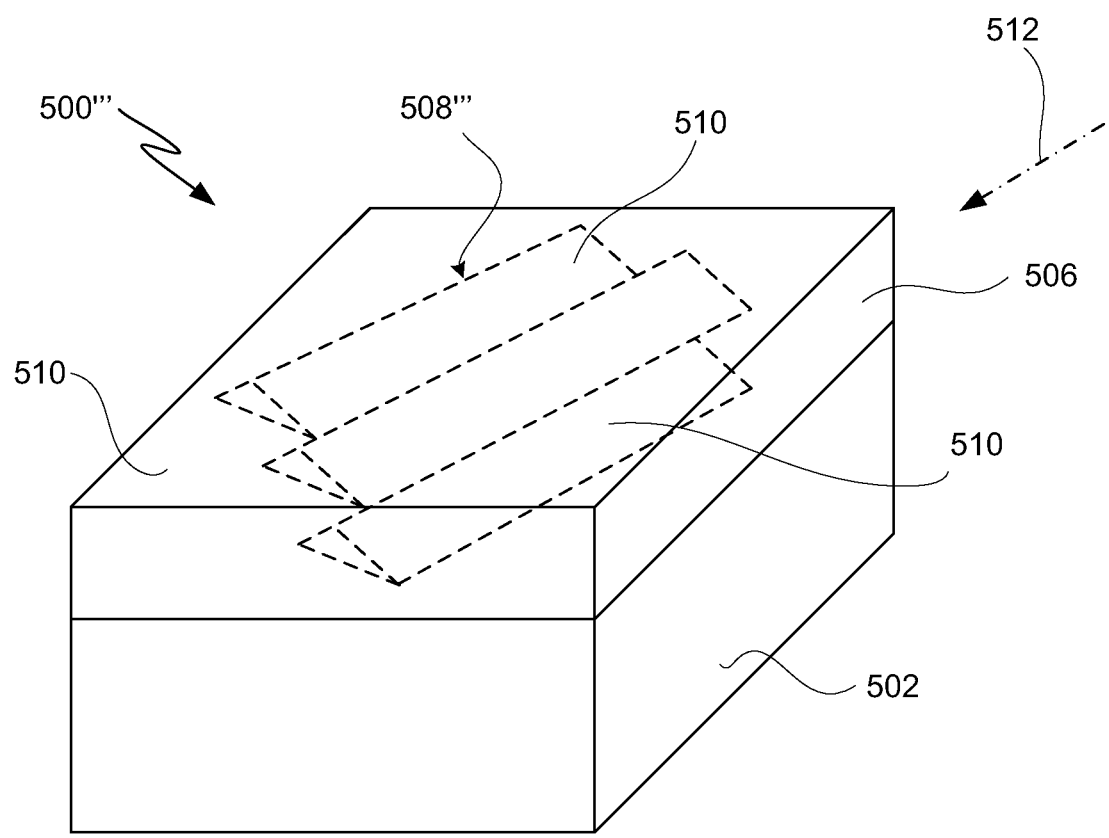
FIG. 5D is a perspective view of a reflective key according to another embodiment.

FIG. 5D is a perspective view of a reflective key 500''' according to another embodiment. In this embodiment, the reflective key 500''' is similar to the reflective key 500 illustrated in FIG. 5A, except that the reflective key 500''' includes a reflective optical component 508''' that can include a plurality of uniformly angled reflective surfaces that are formed as sawtooth-shaped grooves similar to than shown in FIG. 4A. As shown in FIG. 5D, the orientation of the reflective optical component 508''' is itself angled in two dimensions with respect to the plane of the protective layer 506 or the top of the key structure. Here, in generally, it should be noted that the reflective optical component 508''', regardless of the configuration of the one or more angled reflective surfaces being provided, can be skewed in orientation with respect to one or two axes of the plane formed by the protective layer 506 or the top of the key structure.

In addition to the grove implementation shown in FIG. 5D, where the sawtooth shape is evident in a diagonal cross section, another embodiment allows an additional sawtooth shape in, for example, a perpendicular cross section. In this case each blaze structure can be approximately square, with an angle designed to enhance (or even optimize) reflected light to the user. The direction of the repeated pitch may be along or perpendicular to the groves in FIG. 5D, or the repeated pitch may be along or perpendicular to a side of the key, for example.

Figure 5E:
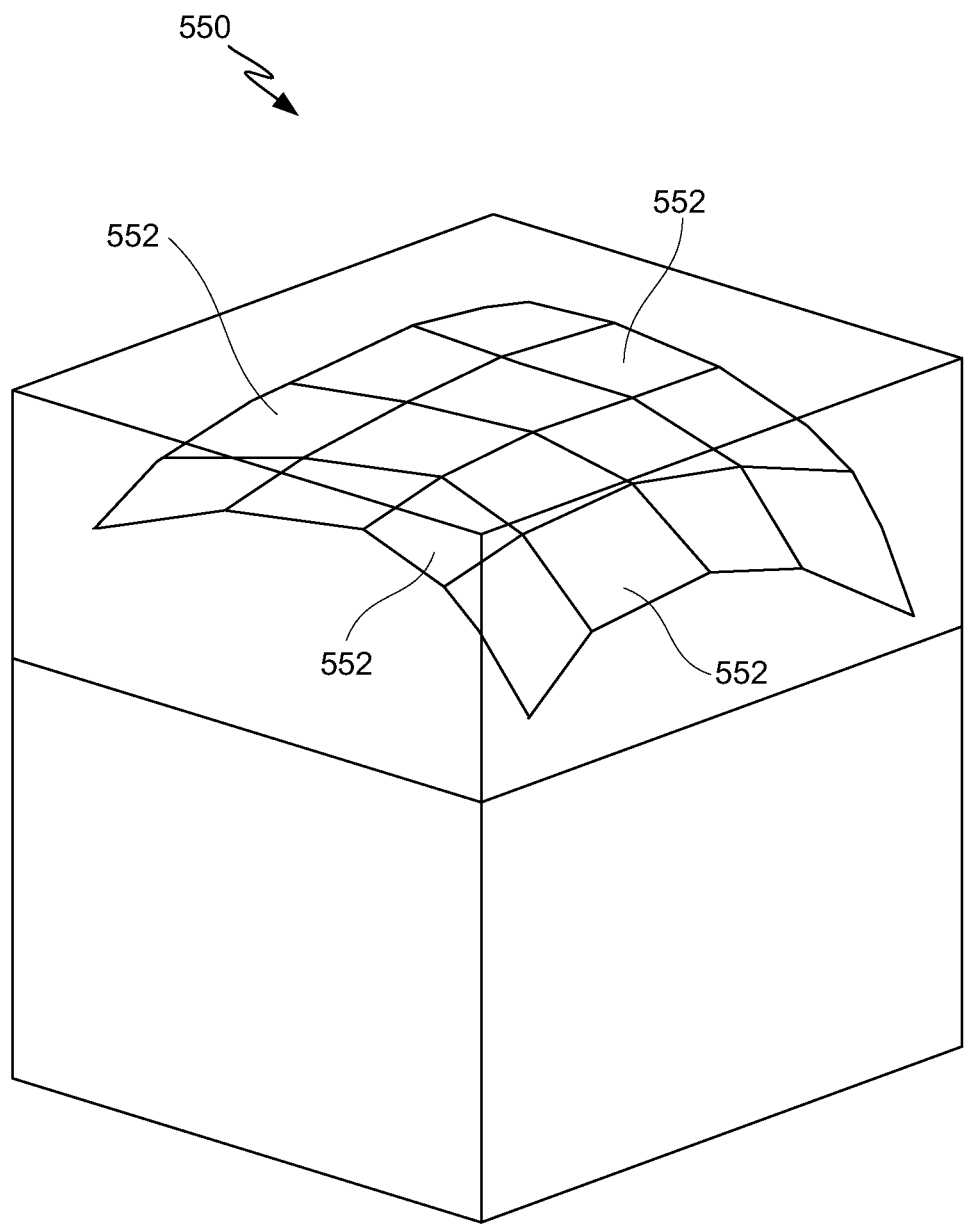
FIG. 5E is a perspective view of a reflective optical component according to one embodiment.

FIG. 5E is a perspective view of a reflective optical component 550 according to one embodiment. The reflective optical component 550 is a three-dimensional structure having a plurality of angled reflective surfaces 552, which can be referred to as facets. The angled reflective surfaces 552 can be flat reflective surfaces (or flat reflective segments). Each of the facets 552 can be used to direct light in a particular direction. These facets 552 (which can be referred to as faceted blazes) can each has multiple reflective surfaces, such as repeated in a sawtooth fashion, along any two directions and not necessarily normal to each other.

In accordance with one embodiment, the facets of the reflective optical component 550 can be referred to more generally as nodes. These nodes, like the facets, are reflective surfaces provided with a key (or other user input mechanism). The nodes can be contiguously formed or arranged as shown in FIG. 5E. However, in another embodiment, the nodes can be formed or arranged such that the nodes are not contiguously formed or arranged. For example, discrete nodes can be formed or provided with a key to provide the desired reflectivity. These nodes can be positioned, sized, and angled to specific x, y and z coordinates to reflect light to a target user viewing position. By engineering nodes for desired optical properties, such as reflectivity, legends provided on the corresponding key can be configured to direct light to a user so that the legends are more visible in low light conditions. The configuration can, for example, be curvilinear, rectilinear, stepped, sawtoothed, or any combination thereof. Each node can be engineered to reflect light in a predetermined select manner.

Figure 6:
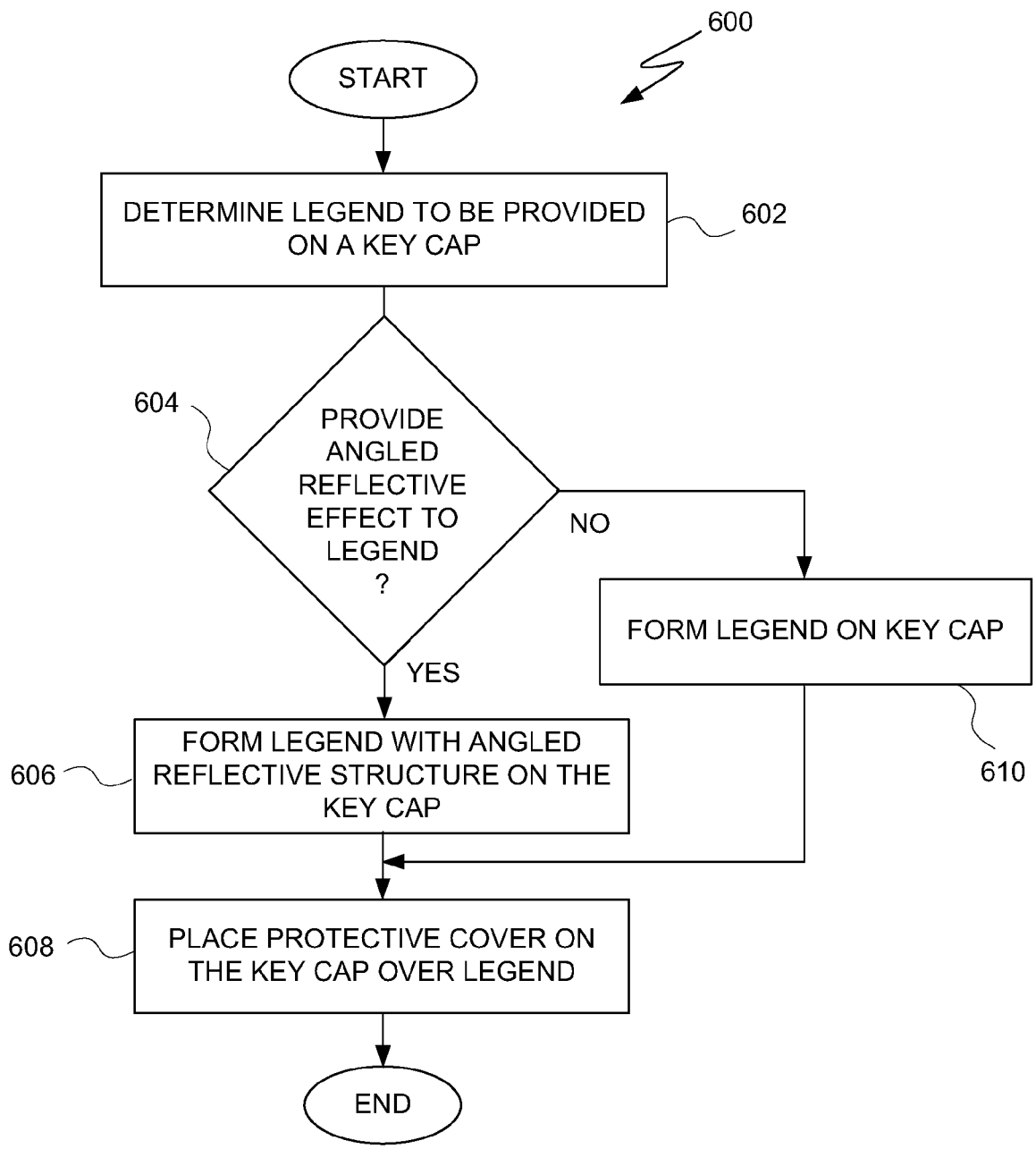
FIG. 6 is a flow diagram of a key cap formation process according to one embodiment.

FIG. 6 is a flow diagram of a key cap formation process 600 according to one embodiment. The key cap formation process 600 is, for example, to form a key cap for used as a key for an electronic device (e.g., computing device). The electronic device can include not only a key region with one or more keys but also a display that can serve as a light source to illuminate the one or more keys.

The key cap formation process 600 can initially determine 602 a legend to be provided on a key cap. For example, the legend can be associated with an alphanumeric character or a graphic symbol (e.g. logo, icon, etc.). After the legend to be provided has been determined 602, a decision 604 can determine whether an angled reflective effect (e.g., blaze effect) is to be provided to the legend. When the decision 602 determines that an angled reflective effect is to be provided, then the legend is formed 606 with an angled reflective structure (e.g., blaze structure) on the key cap. Thereafter, a protective cover can be placed 608 on the key cap over the legend. Alternatively, when the decision 604 determined that an angled reflective effect is not to be provided to the legend, the legend can be formed 610 on the key cap without providing any angled reflective structure. As an example, the legend formed 610 would be formed using a reflective layer that does not include an angled reflective structure, such as a blaze structure. Following the block 610, the key cap formation process 600 can proceed to the block 608 where a protective cover can be placed on the key cap over the legend. Following the block 608, the key cap formation process 600 can end.

Figure 7A:
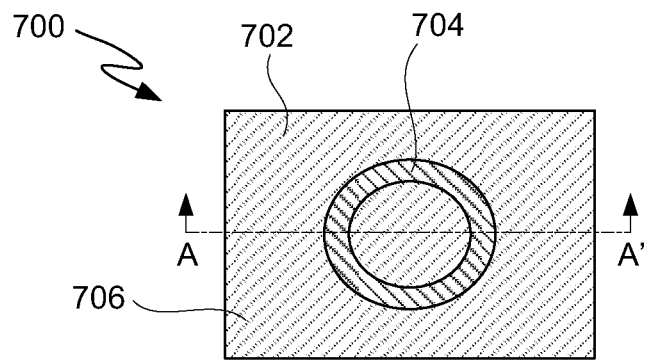
FIG. 7A illustrates an exemplary top surface of a key cap according to one embodiment.

FIG. 7A illustrates an exemplary top surface of a key cap 700 according to one embodiment. The key cap 700 includes a top surface 702. The top surface 702 of the key cap 700 illustrates a reflective legend 704. The reflective legend 704 is formed from a reflective material that includes an angled optical component. In the example shown in FIG. 7A, the reflective legend 704 shown has an "O" shape. A protective layer 706 can be provided on the top surface 702 over the reflective legend 704. The protective layer 706 typically covers at least the reflective legend 704 but also may cover the entire top surface 702 of the key cap 700. The protective layer 706 serves to protect the reflective legend 704. The protective layer 706 can be a substantially transparent layer or coating. In one embodiment, the protective layer 706 also provides some diffusion to mask reflection of screen images from a display device operating as a light source.

Figure 7B:
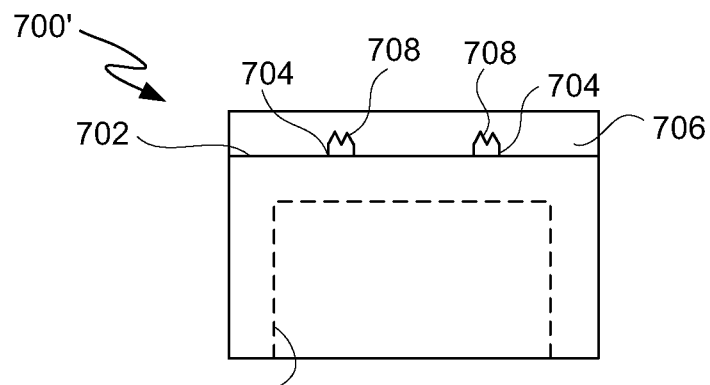
FIG. 7B is a cross-sectional view of a reflective key according to one embodiment.

FIG. 7B is a cross-sectional view of a reflective key 700' according to one embodiment. In one embodiment, the reflective key 700' can be opaque, such as a particular color (e.g., black). The reflective key 700' can also include an inner opening (or hollow portion) 701. The reflective key 700' can include an angled reflective component 704 provided on the top surface 702. The angled reflective component 704 can include a blaze structure 708. In the embodiment illustrated in FIG. 7B, the blaze structure 708 can include a plurality of sawtooth-shaped grooves.

The angled reflective component 704 can be formed from or include a reflective material. The reflective material can be provided by a broad spectrum reflective material. For example, the reflective material can be formed of aluminum, silver or compounds (or alloys) thereof. In particular, the reflective material can be an ink or paint having aluminum or silver fragments therein. One suitable ink is a mirror effect ink from Seiko Advance Ltd. of Tokyo, Japan. One suitable paint is a mirror effect paint from PPG Industries, Inc. of Pittsburgh, Pa.

In addition, the protective layer 706 can be provided over the angled reflective component 704 (including the blaze structure 708). The protective layer 706 is a thin protective coating. The protective layer 706 is at least partially if not fully translucent. The protective layer 706 can be clear in color and may also include glass particles or other clear materials (e.g., acrylic particles) to provide diffusion. The glass particles can, for example, be fibers or spheres. The thickness of the blaze structure 708 and the protective layer 706 depend upon implementation. However, in one example, the blaze structure 708 can have a thickness of about 1-15 micrometers. The thickness of the protective layer 706 depends upon implementation. However, in one example, the protective layer 706 can have a thickness of about 15-30 micrometers, or in a more particular example about 20-22 micrometers.

Figure 7C:
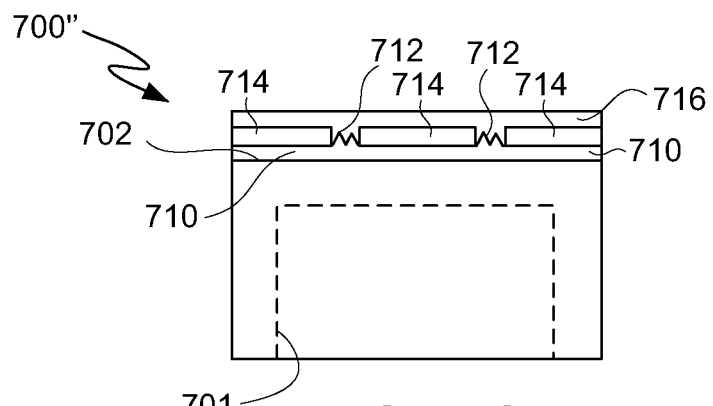
FIG. 7C is a cross-sectional view of a reflective key according to another embodiment.

FIG. 7C is a cross-sectional view of a reflective key 700" according to another embodiment. The reflective key 700" can be opaque, such as a particular color (e.g., black). The reflective key 700" can also include an inner opening (or hollow portion) 701. The reflective key 700" can include a reflective optical layer 710 provided on the top surface 702. The reflective optical layer 710 can include a blaze structure 712 which can include a plurality of reflective surfaces (e.g., a plurality of sawtooth-shaped grooves).

The reflective optical layer 710 can be provided from or include a reflective material. The reflective material can be provided by a broad spectrum reflective material. For example, the reflective material can be formed of aluminum, silver or compounds (or alloys) thereof. In particular, the reflective material can be an ink or paint having aluminum or silver fragments therein. One suitable ink is a mirror effect ink from Seiko Advance Ltd. of Tokyo, Japan. One suitable paint is a mirror effect paint from PPG Industries, Inc. of Pittsburgh, Pa.

Additionally, a patterned layer 714 can be provided over portions of the reflective optical layer 710. The patterned layer 714 is typically an opaque layer, for example, black. The patterned layer 714 can be provided so as to cover at least a portion of the top of the reflective key 700" so that only select portions of the reflective optical layer 710 remain visible. Those portions of the reflective optical layer 710 not covered by the patterned layer 714, namely, the blaze structure 712, yield the desired legend for the reflective key 700". The thickness of the patterned layer 714 also depends upon implementation. However, in one example, the patterned layer 714 can have a thickness of about 8-15 micrometers, or in a more particular example about 9-11 micrometers.

In one embodiment, the patterned layer 714 provides a mask layer that can be disposed over the reflective optical layer 710 (which provides an angled reflective surface). The mask layer provides a mask that covers at least portions of the angled reflective surface. Those portions of the angled reflective surface not being covered by the mask form a reflective legend on the at least one key.

The patterned layer 714 has a pattern that it is formed when the patterned layer 714 is initially applied, or formed into a layer that is initially applied. In one implementation, a layer is patterned when formed. For example, the layer can be sprayed, silk-screened or deposited (e.g., PVD) on in the desired pattern. In another implementation, the layer can be formed and then be patterned. For example, chemical etching or laser ablation can be used to pattern the layer.

After the patterned layer 714 has been applied, a protective layer 716 can be provided over the patterned layer 714. The protective layer 716 can protect the reflective legend that results from the reflective layer 710 and the patterned layer 714. The protective layer 716 is a thin protective coating. The thickness of the protective layer 716 depends upon implementation. However, in one example, the protective layer 716 can have a thickness of about 15-30 micrometers, or in a more particular example about 20-22 micrometers. The protective layer 716 can also provide diffusion, in which case it can include diffusing materials. The protective layer 716 can be applied by being sprayed on. The sprayed on solution for the protective layer 716 can be ink or paint based and is typically clear (e.g., clear acrylic paint, clear resin) and may also include the diffusing materials. The gloss level (or diffusion effect) of the protective layer 716, if diffusion is being provided, can be controlled to limit gloss level (e.g., to about 5 gloss units).

The patterned layer 714 has a pattern that it is formed when the patterned layer 714 is initially applied, or formed into a layer that is initially applied. In one implementation, a layer is patterned when formed. For example, the layer can be sprayed, silk-screened or deposited (e.g., PVD) on in the desired pattern. In another implementation, the layer can be formed and then be patterned. For example, chemical etching or laser ablation can be used to pattern the layer.

The reflective optical component 704 or the reflective optical component 710 discussed herein can be applied as ink or paint as noted above. Alternatively, the reflective layer or mirror elements can be applied by Physical Vapor Deposition (PVD) if formed of metal, such as silver or aluminum. In such case the thickness of the reflective layer or mirror elements can be as thin as one (1) micrometer or less.

Optionally, as noted above, the reflected portion of the light received at the one or more keys can also be diffused. The diffusion can be provided by a layer of diffusive material provided over the reflective optical component. A protective layer can also include diffusive material to provide diffusion.

Figure 8:
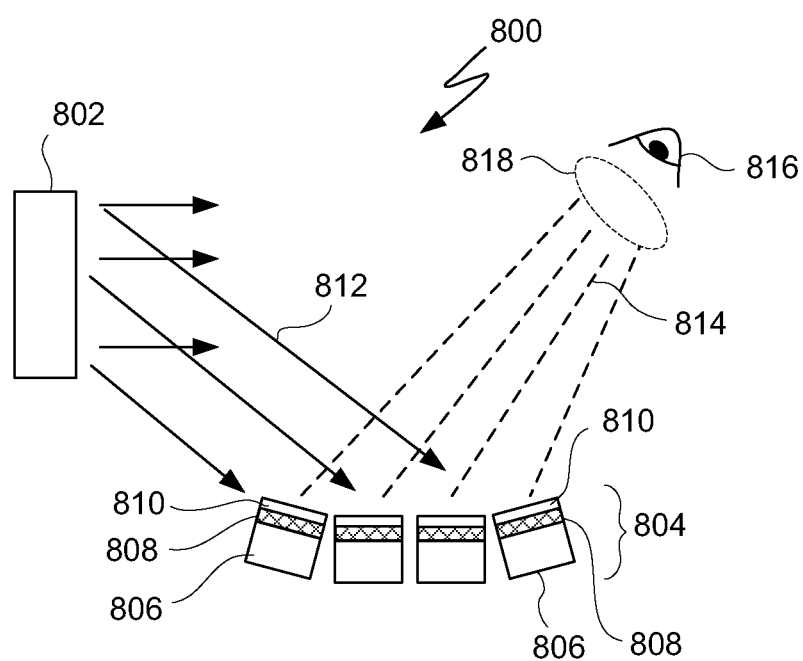
FIG. 8 is a conceptual diagram of an optical arrangement illustrating another embodiment.

FIG. 8 is a conceptual diagram of an optical arrangement 800 illustrating another embodiment. The optical arrangement 800 can, for example, be used with an electronic device. The optical arrangement 800 includes a light source 802. The light source 802 produces light that can be utilized to illuminate not only a display device but also keys within a key region 804. The light source 802 is, for example, provided by a backlight of a LCD display screen. The key region 804 includes a plurality of keys that can be similarly constructed so as to facilitate illumination in low light conditions. In particular, the keys within the key region 804 include key caps 806. A key cap is considered to be an upper portion or top of a key.

The optical arrangement 800 is similar to the optical arrangement 200 illustrated in FIG. 2. However, unlike the optical arrangement 200, the optical arrangement 800 provides one or more of the keys, or their blaze angle design targets, at a determined orientation so as to contribute in directing light from the light source 802 to the user position. As shown in FIG. 8, at least the outer keys in the key region 804 are oriented or angled inward, which tends to direct reflected light more towards a higher user position relative to the key region 804. Alternatively, in another embodiment, at least the outer keys in the key region 804 are oriented or angled outward, which tends to direct reflected light more towards a lower user position relative to the key region 804.

FIG. 8 shows the keys (or at least the keycaps thereof) being angled, but in another embodiment, the keycaps are unchanged from the conventional keyboard (i.e., not angled), but blaze angles are modified from an idea so that light can be aimed to a broader range of user positions. Keys at the left in FIG. 8 can have blaze structures designed to aim light above a nominal user position and keys at the right in FIG. 8 can have blaze structures designed to aim light below the nominal user position. Similarly, keys at the left in FIG. 8 can have blaze structures designed to aim light below the nominal user position and keys at the right in FIG. 8 can have blaze structures designed to aim above below the nominal user position. Similarly, in the other angular direction, keys at the user's left side of the keyboard (e.g., the "A" key) can have blaze structures designed to aim light to the left eye (or farther to the nominal user's left), and keys at the right side of the keyboard can have blaze structures design to aim light to the right eye (or farther to the nominal user's right). Similarly, keys at the user's left side of the keyboard (e.g., the "A" key) can have blaze structures designed to aim light to the right eye (or farther to the nominal user's right), and keys at the right side of the keyboard can have blaze structures design to aim light to the left eye (or farther to the nominal user's left). In this way, light from a display can be reflected to more different user's positions, and thus means are available to design uniformity of the keyboard's reflection brightness. This design approach can be used instead of a faceted blaze or in addition to a faceted blaze. This design approach can be used instead of varying a key's blaze angles across a key, or in addition to varying a key's blaze angles across a key.

Besides orienting the keys, as discussed above, the key caps 806 can be modified to facilitate illumination. In particular, according to one embodiment, applied to the top of each of the key caps 806 is a reflective optical component 808 and an outer layer 810. The reflective optical component 808 can operate to reflect at least a portion of the light 812 from the light source 802 that is incident on the key region 804. The incident light 812 impinges on the keys caps 806 in the key region 804, and passes through the output layer 810 and is then partially reflected by the reflective optical component 808 to provide reflected light 814 directed towards the eyes 816 of a user.

The outer layer 810 can serve as a protective layer (or protective cover) and/or a diffusion layer. The protective layer and the diffusion layer can be separate layers or combined in a single layer.

The protective layer can be provided to protect the reflective optical component 808. The protective layer can be provided over the reflective optical component 808 which is provided on the key caps 806. Typically, the outer layer 810 is substantially optically transparent to the incident light 812 and the reflected light 814.

The reflective optical component 808 direct light to a user position. In some implementation, the reflective optical component 808 can scatter incident light somewhat so that diffusion induced by a diffusion layer many not be needed. The diffusion layer, if provided, can operate to diffuse (or scatter) the reflected light 814 so that the illumination on the key caps 806 is diffused so that any images depicted by the light source 802 are diffused and thus the illumination of the key caps 806 provides general illumination as opposed to a direct reflection of images being depicted by the light source 802.

In general, each of the keys can be formed such that incident light 812 from the light source 802 can direct the reflected light to the user position using one or more reflective surfaces on the corresponding key. The one or more reflective surfaces can be angled to enhance illumination of key legends in low light conditions. The angle of the one or more reflective surface depends on the reflective optical component 808 provide on a given key as well on any orientation angle due to the orientation of the given key. A given key may also have multiple different angles for its multiple reflective surfaces.

Accordingly, user input portion can pertain to a key region having plurality of keys (or key caps). The keys and/or legends thereon can be engineered to direct light to a target user viewing area 818 (e.g., area where the user is typically positioned when using the electronic device having the optical arrangement 800). In one embodiment, the user input portion as whole may be tilted or angled relative to a base or housing to direct light to the target user viewing area 818. Alternatively or additionally, different portions of the user input region may be tilted or angled relative to the base or housing and/or relative to each other to direct light to the target user viewing area 818. By way of example, keys within the key region can be grouped into different sections and each of these sections can tilted or angled differently than other groups of inputs. In one example, the keys can be grouped into left and right, each angled opposite the other, but both angled so as to direct light to the target user viewing area 818. In another example, the keys can be grouped into upper and lower and each of these groups with different angles so as direct light to the target user viewing area 818. In yet another example, the keys can be broken up into quadrants or any other type of configuration that helps direct light to the target user viewing area 818. For example, with four quadrants, the upper/left, upper/right, lower/left and lower/right may be angled differently. Alternatively or additionally, the keys may be tilted or angled relative to the base or housing and/or relative to each other to direct light to the target user view area 818. For example, each key may have its own angle or plurality of angles. Alternatively or additionally, the legends themselves may be tilted or angled relative to the key to direct light to the target user viewing area 818. For example, the legends may have reflective surfaces at a different angle than that of the key. Additionally or alternatively, the legends may be engineered with a variety of shapes or contours to direct light. For example, the legends may be rectilinear and/or curvilinear. Examples include convex, concave, waved, and/or the like. The optical behavior of the legends may be affected by its placement with it corresponding key. For example, in cases where the legend is embedded within a translucent/transparent layer, the optical properties may be modified to compensate for light bending may occur through this layer.

Figure 9:
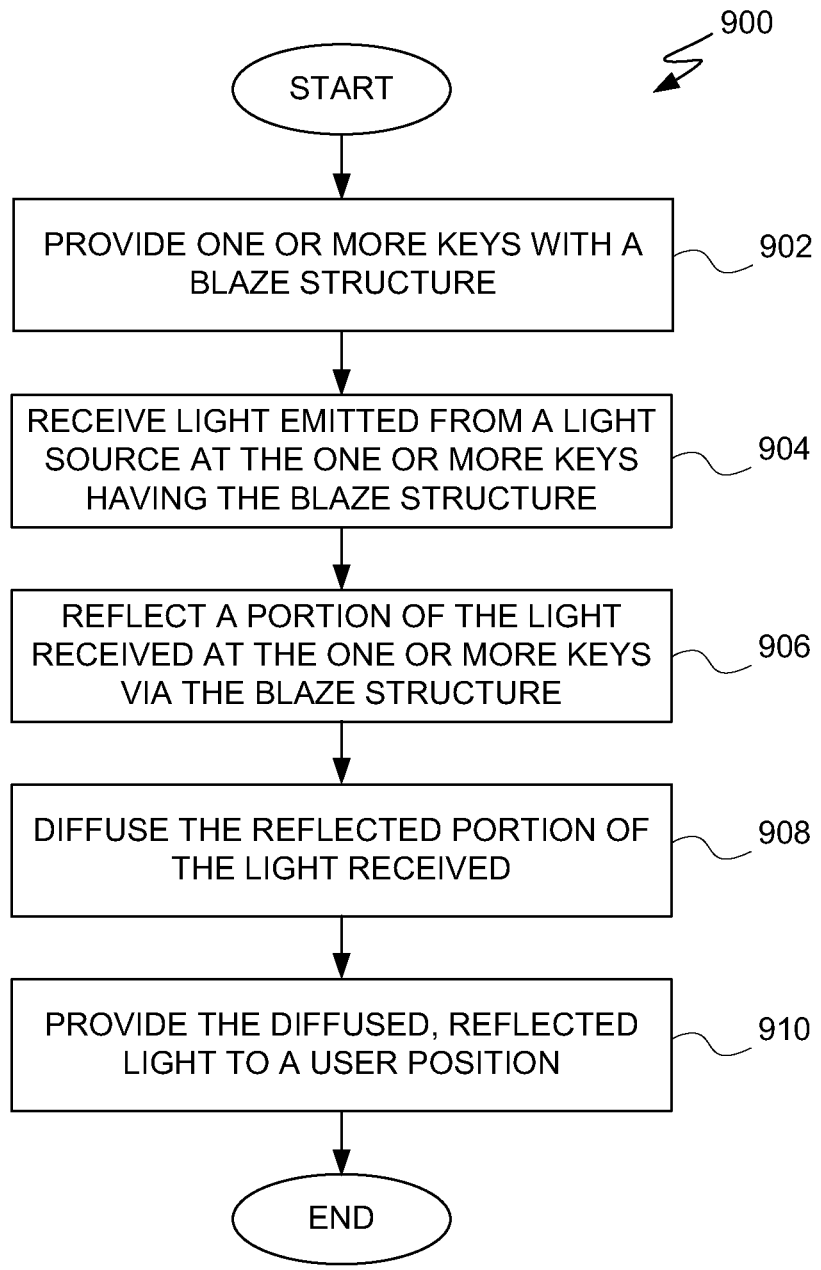
FIG. 9 is a flow diagram of a key illumination process according to another embodiment.

FIG. 9 is a flow diagram of a key illumination process 900 according to another embodiment. The key illumination process 900 is, for example, performed by an electronic device (e.g., computing device) having a light source and a key region with one or more keys. For example, the key illumination process 900 can be performed by the electronic device providing the optical arrangement 200 illustrated in FIG. 2 or the optical arrangement 800 illustrated in FIG. 8. The key illumination process 900 is similar to the key illumination process 300 except that the reflective blaze structure is a blaze structure and reflected light is also diffused.

The key illumination process 900 provides 902 one or more of the keys in the key region with a blaze structure as its optical component. The one or more keys having the blaze structure can receive 904 light emitted from a light source (e.g., a display for the electronic device) at the one or more keys. A portion of the light received at the one or more keys can be reflected 906 via the blaze structure. Thereafter, the reflected light can be diffused 908 and then provided 910 to a user position. As a result, the one or more keys are able to be illuminated using light originating from a light source of the electronic device. The light source can, for example, be a display (screen) for the electronic device, which can be a portable computer. As such, the key illumination process 900 makes uses of an existing light source (e.g., display device) and thus does not require a dedicated light source. The reflection of the light from the one or more keys is due to the blaze structure provided on the one or more keys. The diffusion 908 is optional and can be provided by a diffusive layer provided on the blaze structure.

As noted above, one or more keys of a key region for an electronic device can be provided with a reflective optical component (e.g., blaze structure) to enhance illumination of such keys using reflected light from a display. However, it should be noted that other ones of the keys of the key region can simply be provided with reflective material (i.e., without an optical component). While both the reflective material and the reflective blaze structure are able to reflect light, the reflective optical component can offer the advantage of being able to reflect greater amounts of light. Hence, in the case of a keypad of a portable computer, reflective optical components can be used on those key caps that would otherwise reflect less incident light, such as keys at sides and rear which tend to receive and reflect less incident light.

Although the techniques described above primarily concern reflective legends for user input device, such as keys, in other embodiments, the techniques described herein can be use to provide other reflective markings that would advantageously be more visible in low light conditions. In general, the reflective markings, or annotations, provided on products can be textual and/or graphic. The marking can be provided for informational, cosmetic and/or functional reasons. For example, the markings can be used to provide a product (e.g., a product's housing) with certain information. The marking can, for example, be use to label the product with various information. When a marking includes text, the text can provide information concerning the product (e.g., electronic device). For example, the text can include one or more of: name of product, trademark or copyright information, design location, assembly location, model number, serial number, license number, agency approvals, standards compliance, electronic codes, memory of device, and the like. When a marking includes a graphic, the graphic can pertain to a logo, a certification mark, standards mark or an approval mark that is often associated with the product. The marking can be used for advertisements to be provided on products. The markings can also be used for customization (e.g., user customization) of a housing of a product.

Although the embodiments described herein do not require changes to a display device or keys, in some embodiments, it may be useful to alter the physical configuration of the display device or keys. For example, the display device could be altered such that a portion of its emitted light is incident on the keys to be illuminated. Also, for example, the keys could be altered to allow them to more efficiently receive the light emitted from the display device. For instance, the structure for the key could be angled toward the display device.

Additionally, although embodiment described herein can be used to obviate the need for lighting to keys of a keyboard, such as key or keyboard backlighting. However, in some embodiments it may be desirable to not only provide enhanced illumination of keys in low light conditions through enhanced usage of reflected light as discussed above, but also provide additional lighting to the keys, such as backlighting. In one implementation, the key body can be at least partially transparent or clear and the mostly reflective ink may also allow transmitted light, so that such a key or keyboard may also be backlit.

Additional details on enhancing keycap visibility in low light conditions can be found in U.S. patent application Ser. No. 12/853,176, filed Aug. 9, 2010 and entitled " " METHOD AND APPARATUS FOR ENHANCING KEYCAP LEGEND VISIBILITY IN LOW LIGHT CONDITIONS, which is hereby incorporated herein by reference.

The various aspects, features, embodiments or implementations of the invention described above can be used alone or in various combinations.

Different aspects, embodiments or implementations may, but need not, yield one or more of the following advantages.

One advantage is that legends or marking can be made reflective with appropriate diffusion so that the legends or markings can be visible in low light conditions. Optical components can also be used for enhanced reflectivity. Another advantage is that backlight is not need needed for keys (e.g., key boards or keypads) if the legends on the keys are made suitably reflective. Here, additional components to support backlighting are not needed and thus electronic device can potentially be made thinner. Still another advantage is that keys can be provided with reflective legends in a manner that renders the legends durable, protected and with reliable adhesion.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computing device, comprising:
   a display for presenting displayed data; and
   at least one key configured to facilitate user input to the computing device, the at least one key including at least a key cap, the key cap including a top surface having an angled reflective surface thereon,
   wherein the angled reflective surface is selectively patterned or covered to yield a reflective legend on the at least one key,
   wherein the display emits light towards the at least one key, and wherein a portion of the light emitted from the display is reflected by the angled reflective surface of the key cap and directed toward a user position, and
   wherein the angled reflective surface has a variety of angles in x-axis direction, y-axis direction, or both directions for different reflective surfaces.

2. A computing device as recited in claim 1, wherein the angled reflective surface comprises a plurality of angled reflective surfaces.

3. A computing device as recited in claim 1, wherein the angled reflective surface comprises a reflective sawtooth-shaped groove profile.

4. A computing device as recited in claim 1, wherein the angled reflective surface comprises aluminum, silver or compounds thereof.

5. A computing device as recited in claim 1, wherein the key cap of the at least one key further includes an outer protective layer provided over the angled reflective surface.

6. A computing device as recited in claim 5, wherein the angled reflective surface comprises a multi-faceted reflective surface with each of a plurality of the facets providing a different surface orientation.

7. A computing device as recited in claim 6, wherein the reflective legend of the at least one key is configured to reflect light emitted from the display so that a user of the computing device is better able to see the reflective legend in low light environments.

8. A computing device as recited in claim 1,
   wherein the reflective legend of the at least one key is configured to reflect light emitted from the display so that a user of the computing device is better able to see the reflective legend in low light environments.

9. A computing device as recited in claim 1, wherein the at least one key is at least partially transmissive, and
   wherein the computing device comprises at least one backlight provided behind the at least one key.

10. A computing device as recited in claim 1, wherein the angled reflective surface comprises a layer or coating of ink or paint including reflective material.

11. A computing device as recited in claim 1, wherein the computing device is a portable computing device, and wherein the at least one key is part of a keypad.

12. A computing device as recited in claim 1, wherein the angled reflective surface includes at least a reflective blaze structure.

13. A computing device as recited in claim 12, wherein the reflective blaze structure comprises a reflective sawtooth-shaped groove profile, and wherein the reflective sawtooth-shaped groove profile for the at least one key is angled in one or both an x-axis and a y-axis relative to a top surface of the at least one key which forms an x-y plane.

14. A computing device as recited in claim 12, wherein the reflective blaze structure comprises a multi-faceted reflective surface with each of a plurality of the facets providing a different surface orientation.

15. A computing device as recited in claim 1, wherein the at least one key further includes an outer layer including a diffusion layer provided over the angled reflective surface, and
   wherein the diffusion layer operates to diffuse light to provide a general illumination as opposed to a direct reflection of images being depicted by light from the display.

16. A method for illuminating keys of a portable computing device using light from a display associated with the portable computing device, the method comprising:
   providing one or more keys, each of the one or more keys having at least a key cap, with the key cap having a top surface that includes an angled reflective surface, the angled reflective surface being selectively patterned or covered to yield a reflective legend on the top surface of the key cap;
   receiving, at the one or more keys, at least a portion of light emitted from the display and directed toward the one or more keys;
   reflecting a portion of the light emitted from the display and directed toward the one or more keys via the angled reflective surface of the key cap corresponding to the one or more keys; and
   providing the reflected light to a user position,
   wherein the angled reflective surface has a variety of angles in x-axis direction, y-axis direction, or both directions for different reflective surfaces.

17. A method as recited in claim 16, wherein the angled reflective surface includes at least a reflective blaze structure.

18. A method as recited in claim 16, wherein the angled reflective surface comprises a reflective sawtooth-shaped groove profile.

19. A method as recited in claim 16, wherein the light emitted from the display is provided by a backlight.

20. A computing device, comprising:
   a display for presenting displayed data; and
   at least one key configured to facilitate user input to the computing device, the at least one key including at least a key cap, the key cap having a top surface and including a reflective blaze thereon, the reflective blaze structure being selectively patterned or covered to yield a reflective legend on the top surface of the key cap,
   wherein the display emits light towards the at least one key, and wherein a portion of the light emitted from the display is reflected by the reflective blaze structure and directed toward a user position, and wherein the reflective blaze structure has a variety of angles in x-axis direction, y-axis direction, or both directions for different reflective surfaces.

21. A computing device as recited in claim 20, wherein the reflective blaze comprises a reflective sawtooth-shaped groove profile, and wherein the reflective sawtooth-shaped groove profile for the at least one key is angled in both an x-axis and a y-axis relative to the top surface of the at least one key which forms an x-y plane.

22. A computing device as recited in claim 20, wherein the reflective blaze comprises a reflective sawtooth-shaped groove profile, and wherein the reflective sawtooth-shaped groove profile for the at least one key is faceted in one or both an x-axis and a y-axis relative to the top surface of the at least one key which forms an x-y plane.

23. A computing device as recited in claim 20, wherein the reflective blaze comprises a multi-faceted reflective surface with each of the facets providing a different surface orientation.

24. A computing device as recited in claim 20,
wherein the at least one key further includes an outer layer including a diffusion layer provided over the angled reflective surface, and
wherein the diffusion layer operational to diffuse light to provide a general illumination as opposed to a direct reflection of images being depicted by light from the display.

25. A non-backlit key of an electronic device, comprising:
a top surface; and
a reflective optical component formed at the top surface and representing a legend, the reflective optical component operable to reflect light in a controlled manner such that the legend of the non-backlit key is more visible in low light conditions,
wherein the electronic device is a portable computer having a base portion and a top portion, the top portion including a display,
wherein the display, when operable, produces light and a portion of the produced light impinges on and is reflected by the reflective optical component,
wherein the reflective optical component comprises a plurality of angled reflective surfaces, and
wherein each of the angled reflective surfaces have a variety of angles in x-axis direction, y-axis direction, or both directions for different reflective surfaces.

26. A non-backlit key as recited in claim 25, wherein the reflective optical component comprises a sawtooth-shaped groove profile.

27. A non-backlit key as recited in claim 25, wherein the reflective optical component comprises a layer of reflective ink or paint.

28. A non-backlit key as recited in claim 25, wherein the reflective optical component comprises a blaze structure.

29. A non-backlit key as recited in claim 25,
wherein the reflective optical component comprises a blaze, and
wherein the blaze includes a top surface of the key, the blaze having a substantially reflective surface with a non-zero angle in x-axis direction, y-axis direction, or both directions with respect to the top surface of the key.

30. A blaze as recited in claim 29, wherein the blaze has a repeating angle in a grating which is periodic or aperiodic, in one or both directions.

31. A blaze as recited in claim 30, wherein the blaze has a faceted shape with a plurality of facets, and wherein the repeated angle for the blaze is the same angle or different angles for each of the facets.

32. A blaze as recited in claim 31, wherein the angles for the blazes are designed to aim light from a display towards a nominal user eye position, and wherein the light being aimed by the blazes is dependent upon the position of the associated key on a keyboard.

33. A key of a keyboard, comprising:
a key body configured to receive a user input; and
a legend disposed on a top surface of the key body, the legend occupying only a portion of the key body, the legend being formed by a reflective material, and the legend including a plurality of angled optical components that enhance visibility of the legend in low light conditions,
wherein the angled optical components include a variety of angles in x-axis direction, y-axis direction, or both directions for different reflective surfaces.

* * * * *